P. B. MARFIELD.
FRICTION CLUTCH.
APPLICATION FILED FEB. 19, 1910. RENEWED NOV. 30, 1912.
1,062,568.
Patented May 20, 1913.
2 SHEETS—SHEET 2.
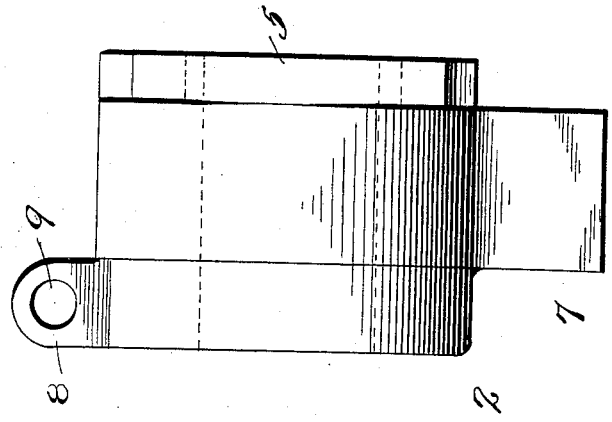
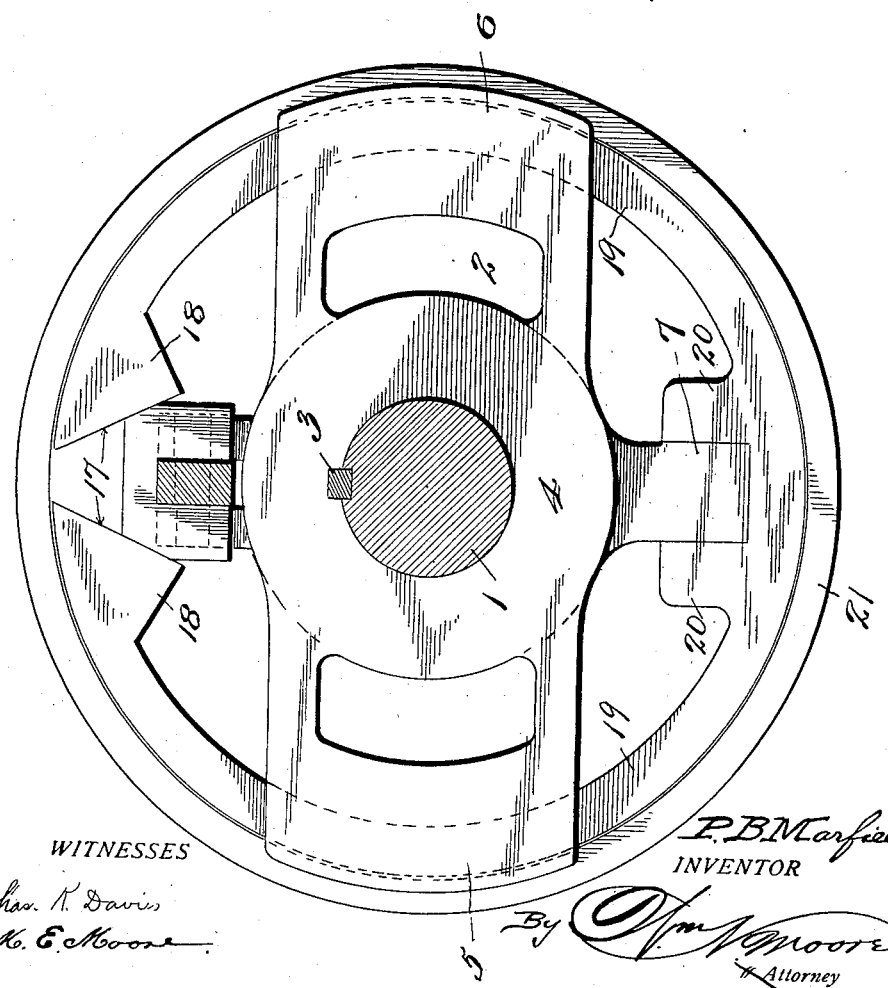
WITNESSES
P. B. Marfield
INVENTOR
By
Attorney

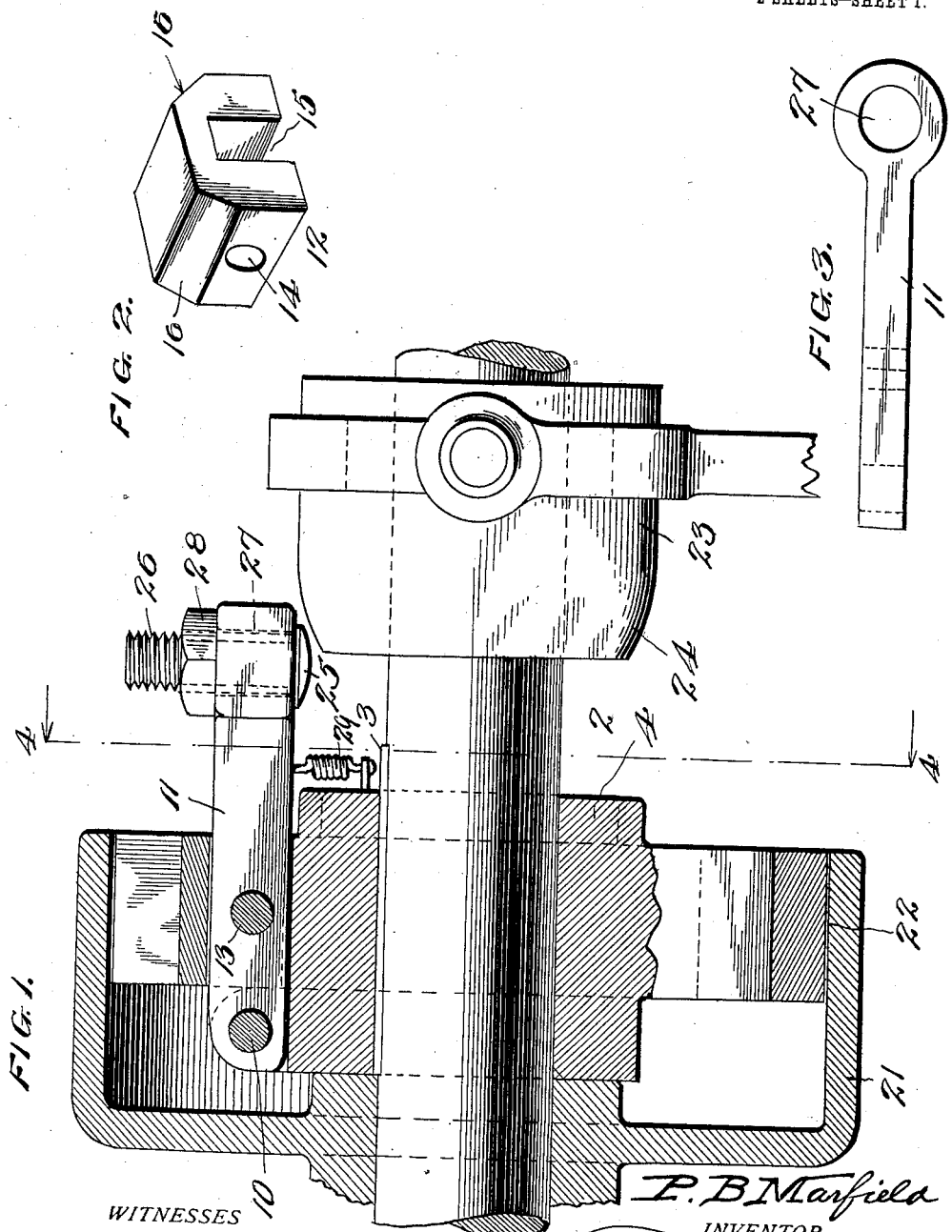

UNITED STATES PATENT OFFICE.

PAUL B. MARFIELD, OF CINCINNATI, OHIO, ASSIGNOR OF ONE-FOURTH TO DWIGHT S. MARFIELD AND ONE-FOURTH TO NEALE P. RILEY, BOTH OF CINCINNATI, OHIO.

FRICTION-CLUTCH.

1,062,568. Specification of Letters Patent. Patented May 20, 1913.

Application filed February 19, 1910, Serial No. 544,842. Renewed November 30, 1912. Serial No. 734,378.

*To all whom it may concern:*

Be it known that I, PAUL B. MARFIELD, a citizen of the United States, residing at Cincinnati, in the county of Hamilton and State of Ohio, have invented certain new and useful Improvements in Friction-Clutches, of which the following is a specification.

The present invention relates to an improved friction clutch, and the prime object of the invention is to simplify the construction and operation of devices of this character, by employing comparatively few elements, to insure a practically direct acting clutch member. The presence of a minimum number of parts, renders the assembling and disassembling of the device, simple and facile, and the likelihood of disarrangement or disconnection of the parts is practically eliminated.

The invention consists essentially in providing the driving member of a clutch of this character with an open ring supported upon a carrier, mounting a lever with its fulcrum on the carrier and in position to distend the ends of the open ring, and thus by expanding the ring, cause it to frictionally engage the driven member.

The invention further consists in certain novel features of construction, and combinations and arrangements of parts as hereinafter more fully set forth.

In the accompanying drawings I have illustrated one example of the physical embodiment of my invention constructed according to the best mode I have so far devised for the practical application of the principles.

Figure 1 is a central vertical section of a clutch embodying the invention, and showing as much of the mechanism as is necessary for an understanding of the operation. Fig. 2 is a perspective view of the wedge block used in the device. Fig. 3 is a plan view of the wedge lever. Fig. 4 is a sectional view taken on line 4—4 Fig. 1, and Fig. 5 is an edge view of the carrier block.

Referring to the drawings in which like reference characters indicate similar parts, the numeral 1 designates the rotating shaft, which may be a line shafting, or used for other suitable purpose. Mounted upon the shaft to rotate therewith is the carrier block indicated as a whole by the numeral 2. The block 2 is splined to the shaft by means of the feather 3 as usual, passing through a groove in the hub 4 of the block.

As shown clearly in Figs. 4 and 5, the carrier block is formed with a pair of side wings or balancing arms 5 and 6, extending diametrically from the hub, and a single lug or projection 7, extending at right angles to the arms 5 and 6. A pair of ears or lugs 8, perforated at 9, are arranged diametrically opposite the lug 7. These ears or lugs 8 form bearings for the pin 10 which is the fulcrum for the lever bar 11, by means of which the members of the clutch are operated. A wedge block 12 is supported on the lever arm by means of a pin 13 passing through the perforations 14 in the wedge block and through a similar opening in the lever arm. The wedge block is bifurcated by a recess 15 so that it straddles the lever bar, and is pivotally movable on its pivot 13. At its upper end it is formed with two inclined or wedge faces 16, 16, and these two faces are for the purpose of co-acting with the complementary inclined faces 17, 17, of the enlarged ends 18, 18, of the broken ring 19.

The open ring 19, at a point diametrically opposite its break, is provided with a pair of spaced lugs 20, 20, between which the arm or lug 7 of the carrier block is seated for the purpose of securing the ring. The arms or wings 5 and 6 of the carrier block also hold the ring to its proper position, as shown in Fig. 4, wherein the remote ends of the wings are shown projecting beyond the periphery of the ring.

In Figs. 1 and 4 I have indicated a driven member of the clutch by the numeral 21 provided with the inner periphery 22, against which the open ring 19 may be expanded. To actuate the clutch I provide a sliding spool 23, of the usual type, except that its inner end is fashioned with a frusto-conoidal shape 24, it being understood of course that the spool is cylindrical in cross section. The spool is movable on the shaft as usual and is adapted to engage under the head 25 of a threaded bolt 26, which is passed through the threaded opening 27 in the lever arm 11 and held therein by means of the nut 28. If desirable the lever arm may be held against centrifugal action of the rotating driving member of the clutch by a spring 29.

The mode of operation will be obvious. When it is desired to drive the member 21, the spool 23 is shifted to the left in Fig. 1. The rounded edge and face 24 of the spool is brought in contact with the rounded head 25 of the bolt 26. The continued movement of the spool lifts the lever 11 with the bolt 10 as the fulcrum. As the lever is raised, it carries with it the wedge block 12, whose two faces 16, 16 ride up the inclined faces 17 of the ring 19, distending the ends 18 and expanding the ring bodily. As the ring expands it frictionally engages the inner periphery 22 of the driven member 21, which is thus caused to rotate with the driving member of the clutch. To disengage the parts the spool is shifted to the right in Fig. 1, permitting the lever 11 to return to normal position, aided by the spring 29, which movement withdraws the wedge block 12, permitting the elasticity of the expansible ring 19 to return it to contracted or normal position.

By reference to Fig. 4, it will be seen that I provide a symmetrically counterbalanced driving member, and it is evident from the drawings and description that I have provided a device of the character described which fulfils the conditions set forth as the purpose and objects of my invention.

By changing the position of the screw 26, the position of the wedge block when in engaged position, is changed, and in this manner the pressure on the frictional surfaces may be regulated, and to compensate for wear on the frictional surfaces.

Having thus fully described my invention, what I claim as new and desire to secure by Letters Patent is:—

In a clutch, the combination with a driven shaft, of a shell pulley loosely mounted thereon, a carrier block secured on the shaft and located within the shell or rim of the shell pulley, a lug projecting from one side of the carrier block, a clutch ring having a pair of spaced lugs lying one on each side of said lug and in tight engagement therewith, a pair of ears formed on the carrier block diametrically opposite the lug thereon, radially extending arms formed on the carrier block at right angles to the ears and lug, said arms extending outward beyond the inner edge of the shell pulley and guiding the clutch ring, said ring having a break formed therein opposite the ears of the block and having inclined edges, a lever pivotally secured to the ears, a wedge block having inclined faces pivotally mounted upon the lever for engaging the inclined edges of the clutch ring, a spring having one end secured to the block and the other to the lever to hold the latter against centrifugal force, an adjustable abutment carried by the outer end of the lever, and a shifting cone collar mounted on the shaft and serving when shifted to raise the lever and force the wedge block between the ends of the ring to cause the latter to engage the shell pulley.

In testimony whereof I affix my signature, in presence of two witnesses.

PAUL B. MARFIELD.

Witnesses:
EDITH WEDDENDORF,
ADOLPH JULIUS FURER.

Copies of this patent may be obtained for five cents each, by addressing the "Commissioner of Patents. Washington, D. C."